United States Patent
Reiser et al.

(10) Patent No.: US 11,655,876 B2
(45) Date of Patent: May 23, 2023

(54) GAS STRUT, METHOD FOR PRODUCING THE GAS STRUT, DRIVE FOR A FLAP WITH THE GAS STRUT

(71) Applicant: STABILUS GMBH, Koblenz (DE)

(72) Inventors: Alexander Reiser, Münstermaifeld (DE); Ulrich Probst, Hilscheid (DE); Felix Beib, Koblenz (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 17/468,822

(22) Filed: Sep. 8, 2021

(65) Prior Publication Data
US 2022/0074462 A1 Mar. 10, 2022

(30) Foreign Application Priority Data
Sep. 10, 2020 (DE) ...................... 10 2020 123 636.0

(51) Int. Cl.
*F16F 9/52* (2006.01)
*F16F 9/06* (2006.01)
*F16F 9/43* (2006.01)

(52) U.S. Cl.
CPC ................ *F16F 9/52* (2013.01); *F16F 9/062* (2013.01); *F16F 9/064* (2013.01); *F16F 9/43* (2013.01)

(58) Field of Classification Search
CPC .... F16F 9/062; F16F 9/064; F16F 9/12; F16F 9/43; F16F 9/52; F16F 9/526
USPC ......................................................... 188/276
See application file for complete search history.

(56) References Cited

U.S. PATENT DOCUMENTS

| | | | | |
|---|---|---|---|---|
| 3,444,830 A | * | 5/1969 | Doetsch | A47B 27/06 108/2 |
| 4,513,953 A | * | 4/1985 | Molders | F16F 13/002 267/64.11 |
| 6,974,001 B2 | * | 12/2005 | Bauman | F16F 9/52 188/315 |
| 11,378,150 B1 | * | 7/2022 | Schmidt | F16F 9/185 |
| 2005/0104267 A1 | * | 5/2005 | Bauman | F16F 9/52 267/64.11 |

(Continued)

FOREIGN PATENT DOCUMENTS

DE 3141295 A1 4/1983
DE 10313440 A1 10/2004
(Continued)

*Primary Examiner* — Thomas W Irvin
(74) *Attorney, Agent, or Firm* — Schmeiser, Olsen & Watts, LLP

(57) ABSTRACT

Provided is a gas strut, including: an outer working space arranged radially to the stroke axis between the working cylinder and the equalizing cylinder, the outer working space being connected to the inner working space in a gas-conducting manner; an equalizing piston enclosing the working cylinder radially to the stroke axis, the equalizing piston) being mounted displaceably along the stroke axis, delimiting the outer working space on one side transversely to the stroke axis and being subjected to a pressure of the working medium and a pressure of the equalizing medium so as to increase the volume of the outer working space; and a restoring medium arranged in a restoring space radially to the stroke axis between the working cylinder and the equalizing cylinder, the equalizing piston being subjected to a pressure of the restoring medium so as to decrease the volume of the outer working space.

14 Claims, 2 Drawing Sheets

(56) References Cited

U.S. PATENT DOCUMENTS

Figure 1:
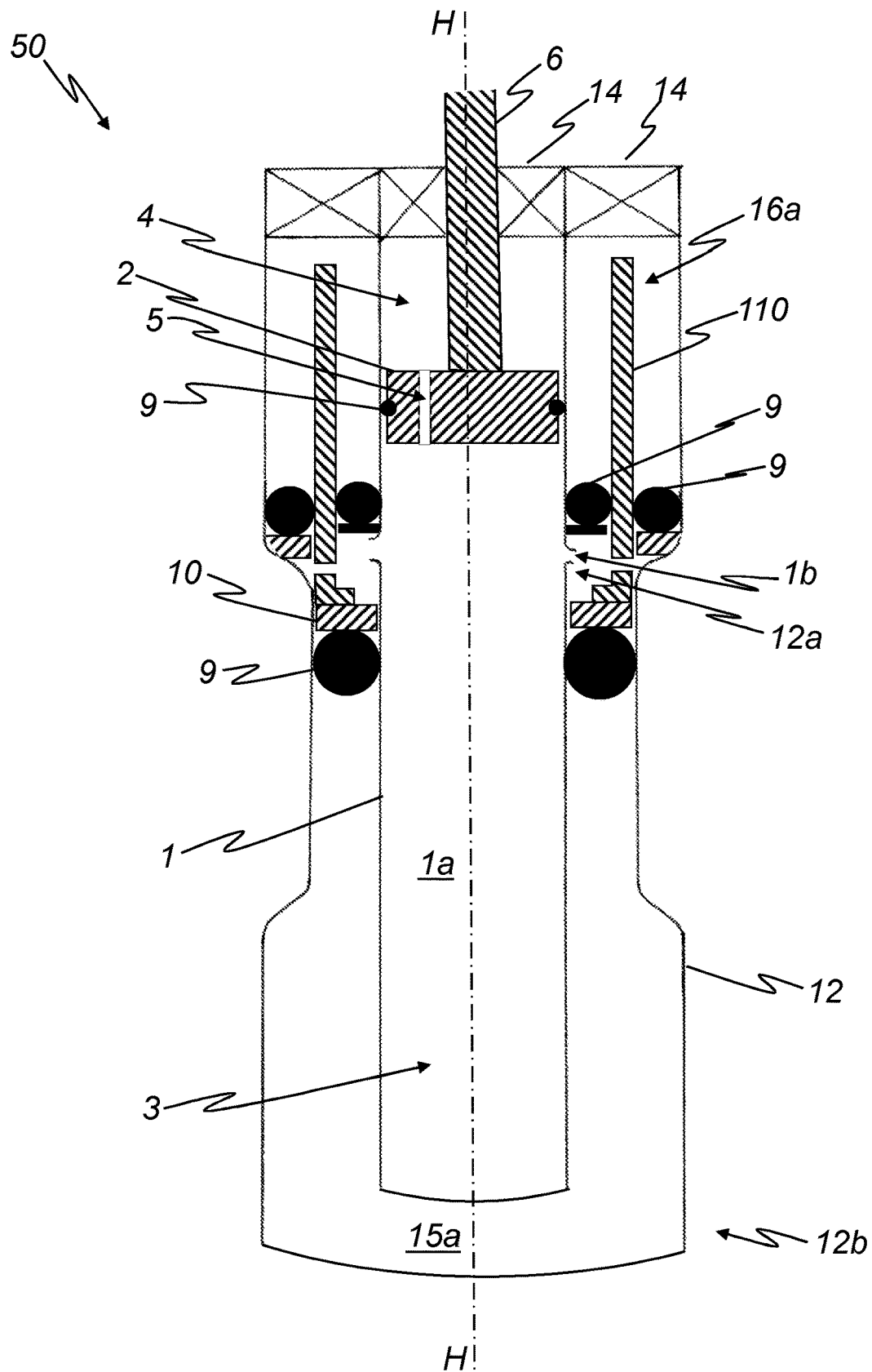

2021/0122440 A1* 4/2021 Noguchi .................. F16F 9/185
2022/0221021 A1* 7/2022 Schmidt .................. F16F 9/185

FOREIGN PATENT DOCUMENTS

| DE | 112006000335 T5 | 3/2008 | | |
| DE | 102008045903 A1 | 3/2010 | | |
| DE | 102020113750 A1 * | 11/2021 | ............. | F16F 9/526 |
| EP | 1795777 A2 | 6/2007 | | |
| JP | S6372931 A | 4/1988 | | |

* cited by examiner

GAS STRUT, METHOD FOR PRODUCING THE GAS STRUT, DRIVE FOR A FLAP WITH THE GAS STRUT

CROSS-REFERENCE TO RELATED APPLICATIONS

This application claims priority to DE 10 2020 123 636.0, having a filing date of Sep. 10, 2020, the entire contents of which are hereby incorporated by reference.

FIELD OF TECHNOLOGY

The following relates to a gas strut with a working cylinder which encloses an inner working space filled with a working gas, a working piston mounted displaceably along a stroke axis in the inner working space, an equalizing cylinder which encloses the working cylinder at least over a partial length of the working cylinder along the stroke axis, and an equalizing medium which expands upon an increase in temperature, arranged in an equalizing space radially to the stroke axis between the working cylinder and the equalizing cylinder.

The following furthermore relates to a method for producing the gas strut and to a drive for a flap with the gas strut.

BACKGROUND

The gas contained in gas struts expands as the temperature T rises and contracts as the temperature T drops, or if the volume V is constant the gas pressure p rises or falls (for an ideal gas in accordance with: $p \times V = n \times R \times T$). As a result, the spring force provided by a gas strut is also temperature-dependent. In many applications this leads to problems, which is why it would be advantageous to compensate for this effect.

For example, when used in a tailgate of a vehicle, the temperature dependence of the spring force leads to the gas strut having to be configured to be more powerful than necessary for most temperatures in order to provide a sufficient spring force even at low temperatures (e.g., at −30° C. to 0° C.) in order to keep the tailgate open reliably. This however on average increases the necessary motor power of an automatic drive which is intended to close the tailgate against the gas strut, since the gas strut is usually operated at medium temperatures (e.g., from 0° C. to 25° C.) and has a higher spring force there than would be necessary. A high motor power requires an undesirably large and heavy motor and results in an undesirably high power consumption of the motor. Furthermore, due to the temperature dependence of the spring force in manual operation the ease of operation at medium and higher temperatures (e.g., above 25° C.) is reduced, since a large force is necessary to compress the gas strut when closing the tailgate.

Patent application EP 1 795 777 A1 describes a gas strut, comprising a working cylinder which together with an equalizing piston arrangement delimits a working space filled with a working medium. The equalizing piston arrangement is pressurized by the pressure of the working medium and the pressure of an equalizing medium which expands upon an increase in temperature, provided in an equalizing space so as to increase the volume of the working space. The equalizing medium therefore reduces the temperature dependence of the gas strut spring force by adapting the volume available to the working medium dependent on temperature.

At present, several non-optimal solutions are offered in the conventional art to compensate for the temperature dependence of the spring force of a gas strut:

a. temperature compensation by making available an additional volume when it is cold, for example by way of a temper-driven valve as described in DE 11 2006 000 335 T5, b. the use of spring struts, i.e., in particular a combination of gas strut and mechanical spring, and also c. the use, described in EP 1 795 777 A1, of an equalizing medium to reduce the temperature dependence.

Option a has a limited degree of temperature compensation and a changed spring rate due to the making available of the additional volume. Furthermore, the overall length is considerably greater than with a simple gas strut.

Option b has the disadvantage that spring struts of sufficient dimensions are very expensive to produce and heavy and have an unfavourable spring rate. Furthermore, the temperature dependence cannot be completely overcome.

Option c is technically very complex and above all cannot be implemented economically with regard to assembly. Furthermore, very high pressure may occur in the equalizing space under certain operating conditions, which places a great stress on sealing elements and tubes of the gas strut. Furthermore, the overall length of the gas strut is lengthened by the temperature compensation being achieved by a lengthening of the working space, which is considerable compared with an uncompensated gas strut, which clearly restricts the possible applications.

SUMMARY

An aspect relates to an inexpensive, durable gas strut which is versatile in use and which has as low as possible a temperature dependence of the spring force. Furthermore, the aspect of embodiments of the invention is to create a production method for the gas strut which is as inexpensive and reliable as possible.

A gas strut according to embodiments of the invention comprises at least one working cylinder which encloses an inner working space filled with a working gas. The working cylinder is for example formed substantially hollow-cylindrically and/or arranged coaxially to the stroke axis defined further below and/or encloses the working space in a gas-tight manner apart from a number of connections to the outer working space for the working gas which is described further below. The working gas is for example nitrogen, or another gas known for filling gas struts. The working cylinder is in one piece so that the gas strut may be produced as easily as possible.

The gas strut comprises at least one working piston mounted displaceably along a stroke axis in the inner working space. The working piston may, as is conventional with gas struts, divide the working space into two chambers and/or be connected to a piston rod which transmits a movement of a component connected to the gas strut relative to the working cylinder to the working piston.

The gas strut comprises at least one equalizing cylinder which encloses the working cylinder at least over a partial length of the working cylinder along the stroke axis, in particular in a gas-tight manner for the working gas. The equalizing cylinder is for example rotationally symmetric to the stroke axis and/or encloses the working cylinder over its entire length along the stroke axis or even beyond, so that the equalizing cylinder forms at least one excess length over the working cylinder along the stroke axis. The equalizing cylinder is formed, for example, substantially hollow cylindrically. The equalizing cylinder is in one piece so that the gas strut may be produced as easily as possible.

The gas strut comprises at least one equalizing medium which expands upon an increase in temperature, arranged in at least one equalizing space which is located at least radially to the stroke axis between the working cylinder and the equalizing cylinder. The equalizing medium fills the equalizing space.

The equalizing medium is an expansion substance, for example an expansion wax, in particular a mixture of paraffins and/or alkanes, an oil or a two-phase medium, the equalizing medium possibly being configured in particular as described in EP 1 795 777 A1 or DE 10 2020 113 749 A1, from which the advantages mentioned therein appear.

The gas strut comprises at least one outer working space arranged at least radially to the stroke axis between the working cylinder and the equalizing cylinder, the outer working space being connected to the inner working space in a gas-conducting manner. The outer working space is for example formed substantially hollow-cylindrically and/or arranged coaxially to the stroke axis. The outer working space is connected to the inner working space in a gas-conducting manner by way of a number of openings, in particular bores radially to the stroke axis, through a lateral wall of the working cylinder. The lateral wall runs around the stroke axis. Connecting the outer working space with the inner working space through the lateral wall has the advantage that the outer working space can be arranged completely alongside the inner working space or enclosing the inner working space in relation to the stroke axis. This advantageously results in a particularly short length of the gas strut along the stroke axis. The end walls of the working cylinder aligned transversely to the stroke axis are closed to the working gas.

The gas strut comprises at least one equalizing piston enclosing the working cylinder radially to the stroke axis, the equalizing piston being mounted displaceably along the stroke axis, delimiting the outer working space at least on one side transversely to the stroke axis and being pressurized by a pressure of the working medium and a pressure of the equalizing medium so as to increase the volume of the outer working space.

The equalizing piston is for example formed hollow-cylindrically and/or arranged coaxially to the stroke axis. The equalizing piston is in one piece so that the gas strut can be produced as easily as possible. The equalizing piston is arranged completely in the equalizing cylinder. This has the advantage that the length of the gas strut measured along the stroke axis does not change when the equalizing piston is displaced along the stroke axis. The length is therefore not temperature dependent.

In the event of an increase in temperature, the equalizing medium expands and thereby displaces the equalizing piston along the stroke axis such that the outer working space is increased. As a result, the volume available to the working gas in the inner and outer working space is increased, which counteracts a pressure increase of the working gas due to the increase in temperature. By suitable selection of the equalizing medium and/or the geometric configuration of the gas strut, temperature dependence of the pressure of the working gas and the resultant spring force of the gas strut can thus be reduced or even completely compensated. In particular, considerably better compensation can be achieved than with a spring strut.

The arrangement according to embodiments of the invention of the outer working space radially to the stroke axis between the working cylinder and the equalizing cylinder has the particular advantage that no lengthening of the overall length of the gas strut along the stroke axis compared with a gas strut without an outer working space is necessary. As a result, a considerably lower overall length of the gas strut can be achieved than in accordance with EP 1 795 777 A2, as a result of which the gas strut can be used in a more versatile manner.

The gas strut comprises at least one restoring medium arranged in at least one restoring space, which is arranged at least radially to the stroke axis between the working cylinder and the equalizing cylinder, the equalizing piston being pressurized by a pressure of the restoring medium so as to decrease the volume of the outer working space. The restoring medium fills the restoring space.

The restoring space is configured for example rotationally symmetrically to the stroke axis. The outer working space is arranged along the stroke axis between the equalizing space and the restoring space. The restoring space is arranged at one end of the gas strut and the equalizing space at the opposite end of the gas strut along the stroke axis. By arranging the outer working space between the equalizing space and the restoring space, the equalizing medium and the restoring medium can act on the volume of the outer working space in opposite directions to each other in a particularly simple manner, so that a temperature dependency of the spring force of the gas strut is compensated both during heating and cooling.

The restoring medium advantageously ensures that, if the equalizing medium contracts when the temperature drops, the equalizing piston moves such that the outer working space is decreased. As a result, a smaller volume is available to the working gas in the inner and outer working space, which counteracts a reduction in the pressure of the working gas due to the dropping temperature. Ideally, the equalizing piston is reversibly moved by the equalizing medium, the working gas and the restoring medium in the event of temperature fluctuations, so that a temperature dependence of the spring force of the gas spring is permanently compensated.

The arrangement according to embodiments of the invention of the restoring space radially to the stroke axis between the working cylinder and the equalizing cylinder has the particular advantage that no lengthening of the overall length of the gas strut along the stroke axis compared with a gas strut without a restoring space is necessary. As a result, a considerably lower overall length of the gas strut can be achieved than in accordance with EP 1 795 777 A2, as a result of which the gas strut can be used in a more versatile manner.

The gas strut comprises at least one tappet which can be expelled out of the equalizing space along the stroke axis towards the equalizing piston by the pressure of the equalizing medium.

The tappet may for example be formed hollow-cylindrically and/or arranged coaxially to the stroke axis. The tappet has a smaller cross-sectional area transversely to the stroke axis than the equalizing piston. As a result, a given change in volume of the equalizing medium causes a further displacement of the equalizing piston than without the tappet, so that a temperature dependency of the spring force of the gas strut can be compensated more effectively.

The tappet may advantageously connect the equalizing piston to the equalizing medium if the equalizing piston is arranged on that side of the outer working space which is remote from the equalizing space. As a result, expansion of the equalizing medium can bring about an increase in the outer working space in a particularly simple manner.

The equalizing cylinder forms along the stroke axis at least one excess length over the working cylinder, the at least one excess length containing a partial region of the equalizing space and/or of the restoring space.

By a partial region of the equalizing space and/or of the restoring space being arranged in the excess length, the gas strut can contain a larger amount of equalizing medium and/or restoring medium without increasing the diameter of the gas strut transversely to the stroke axis. As a result, the gas strut can be adapted to different requirements with respect to the pressures to be applied by the equalizing medium and/or the restoring medium and with respect to the installation space available for the gas strut.

For practical applications of the gas strut in vehicle manufacturing, it has proved particularly advantageous to arrange a partial region of the restoring space in the excess length. As a result, the restoring space can be made of sufficiently large dimensions so that the pressure of the restoring medium during operation of the gas strut is limited to values which are non-critical for conventional sealing means or seal and materials of the equalizing cylinder and of the working cylinder, for example below 250 bar.

The gas strut comprises a piston rod fastened to the working piston and mounted displaceably along the stroke axis in the working cylinder, the excess length being arranged at that end of the working cylinder which is remote from the piston rod along the stroke axis. This yields the advantage that a stroke movement of the piston rod and connection of the piston rod to other components are not hindered by the excess length.

The gas strut comprises a piston rod fastened to the working piston and mounted displaceably along the stroke axis in the working cylinder, the restoring space being arranged at that end of the working cylinder which is remote from the piston rod along the stroke axis.

Typically, a gas strut is produced by inserting the working piston with the side which is remote from the piston rod forwards into the working cylinder and filling the working gas into the working cylinder from the side on which the piston rod protrudes out of the working cylinder. Filling of an in particular gaseous restoring medium and an in particular wax-like equalizing medium can be integrated into this workflow particularly simply if the equalizing space is arranged on that side of the working cylinder which is remote from the piston rod.

The outer working space has, transversely to the stroke axis, a smaller diameter than the equalizing space and/or the restoring space. As a result, a sufficiently large volume for the equalizing medium and/or the restoring medium is available in the equalizing space and/or in the restoring space to guarantee reliable operation with extensive compensation of the temperature dependence of the spring force under typical conditions of use of the gas strut. At the same time the length of the gas strut measured along the stroke axis is as small as possible.

The equalizing cylinder encloses the equalizing space, the outer working space and the restoring space radially to the stroke axis, wherein a diameter of the equalizing cylinder measured transversely to the stroke axis is widened in a region of the equalizing space and/or of the restoring space relatively to a region of the outer working space. In this embodiment, the different diameters of the outer working space and the equalizing space and/or restoring space are particularly easy to produce.

In particular, a sufficiently large restoring space ensures that the pressure of the restoring medium remains limited to values which are non-critical for conventional sealing means or seal and materials of the equalizing cylinder and of the working cylinder, for example below 250 bar. A sufficiently large equalizing space ensures that the equalizing medium expands sufficiently upon an increase in temperature to increase the outer working space to such an extent that the pressure of the working gas does not rise significantly.

In one embodiment, the restoring medium is a gas, in particular the working gas. A gas has the advantages over a mechanical spring of lesser mass and noise-free operation. The use of the working gas as the restoring medium simplifies the production of the gas strut, since only one gas is used. Additionally, or alternatively to a gaseous restoring medium, the restoring medium may comprise a mechanical restoring spring in the restoring space.

The restoring space contains a multiplication piston mounted displaceably along the stroke axis, the multiplication piston dividing the restoring space into a liquid space in contact with the equalizing piston and a gas space separated in a gas-tight manner from the equalizing piston.

The liquid space is filled with a hydraulic fluid, in particular a hydraulic oil, and the gas space is filled with the restoring medium, which is in the form of a gas, in particular the working gas.

A cross-sectional area of the multiplication piston transversely to the stroke axis is larger, for example twice as large as to ten times larger, in particular five times larger, than a cross-sectional area of the equalizing piston transversely to the stroke axis. As a result, the multiplication piston and the equalizing piston together with the hydraulic fluid located therebetween act as a hydraulic multiplication. With the hydraulic multiplication, a lower pressure is thus necessary in the restoring space for compressing the equalizing medium upon cooling than without a hydraulic multiplication. This helps preserve seals and walls delimiting the restoring space.

The multiplication piston has a larger or smaller external diameter transversely to the stroke axis than the equalizing piston, or the same external diameter as the equalizing piston.

The multiplication piston is of disc-shaped configuration, with a disc plane oriented transversely to the stroke axis and/or arranged along the stroke axis before that end of the working cylinder which is remote from the piston rod. Compared with an equalizing piston arranged in a ring around the working cylinder, a disc-shaped multiplication piston may also have a larger cross-sectional area when the multiplication piston does not have a larger external diameter than the equalizing piston.

The following relates to a method for producing a gas strut according to embodiments of the invention. The method comprises at least the following steps:

a. arranging the working cylinder of the gas strut in the equalizing cylinder of the gas strut;
b. filling the restoring medium, the equalizing piston and the equalizing medium of the gas strut in a space between the working cylinder and the equalizing cylinder after the arranging;
c. introducing the working piston and the working gas of the gas strut into the working cylinder after the step of arranging, and
d. gas-tight closing of the working cylinder and the equalizing cylinder after the steps of filling and introducing.

The method comprises simultaneous introducing of the working gas into the inner and outer working space and filling with the working gas as restoring medium into the restoring space of the gas strut, in particular through a non-return valve from the working space to the restoring space and letting off part of the working medium from the inner and outer working space after the introducing and filling.

Simultaneous introducing and filling have the advantage that assembly of the gas strut can be speeded up and simplified. Letting off part of the working medium from the working space ensures that the working medium serving as a restoring medium in the restoring space is at a higher pressure than the working medium in the inner and outer working space. As a result, the restoring medium can restore the equalizing piston at low temperatures counter to the pressure of the working medium and of the equalizing medium into a position with minimal volume of the outer working space.

The method comprises widening a diameter of the equalizing cylinder measured transversely to the stroke axis in a region of the equalizing space and/or of the restoring space relatively to a region of the outer working space.

The following relates to a drive system for a flap with
 a. a gas strut according to embodiments of the invention for supporting the flap, and
 b. an electromechanical drive, for example a linear drive, in particular a spindle drive, for driving the flap.

The flap may for example be a flap of a vehicle, in particular an engine bonnet, a boot lid, a luggage-compartment door or a wing door.

Drive systems for a flap with a gas strut for supporting the flap and an electromechanical drive for driving the flap are known in the conventional art. Apart from the use of a gas strut according to embodiments of the invention instead of a generic one, the drive system according to embodiments of the invention may be constructed like a corresponding drive system from the conventional art, for example from DE 103 13 440 A1 or DE 10 2008 045 903 A1.

The gas strut of the drive system serves to hold the flap in any position whatsoever counter to gravity, while the electromechanical drive serves to open and close the flap. Additionally, as in DE 103 13 440 A1 and DE 10 2008 045 903 A1, provision may be made for the flap to be actuated manually.

The gas strut must have such a high spring force that it can hold the flap even at low ambient temperatures. Since the spring force in conventional gas struts increases with increasing temperature, this leads to a very large force having to be applied by the electromechanical drive or an operator at high temperatures in order to close the flap. Therefore, the drive system has to comprise a very powerful electromechanical drive, which is expensive, takes up a lot of installation space and uses a lot of energy during operation. Furthermore, a large amount of wear of the electromechanical drive and other parts mechanically connected to the flap, for example hinges, occurs.

In the conventional art, these problems are avoided by using a spring strut instead of the gas strut (e.g., DE 10 2008 045 903 A1, para. [0021]). Although a spring strut has a virtually temperature-independent spring force, it is larger, heavier and more expensive than a gas strut of comparable spring force.

Due to the use of a temperature-compensated gas strut according to embodiments of the invention instead of a gas strut customary in the field, thus a particularly inexpensive, durable, compact and energy-saving drive system which is simple to produce and to operate for the flap is created.

BRIEF DESCRIPTION

Figure 2:
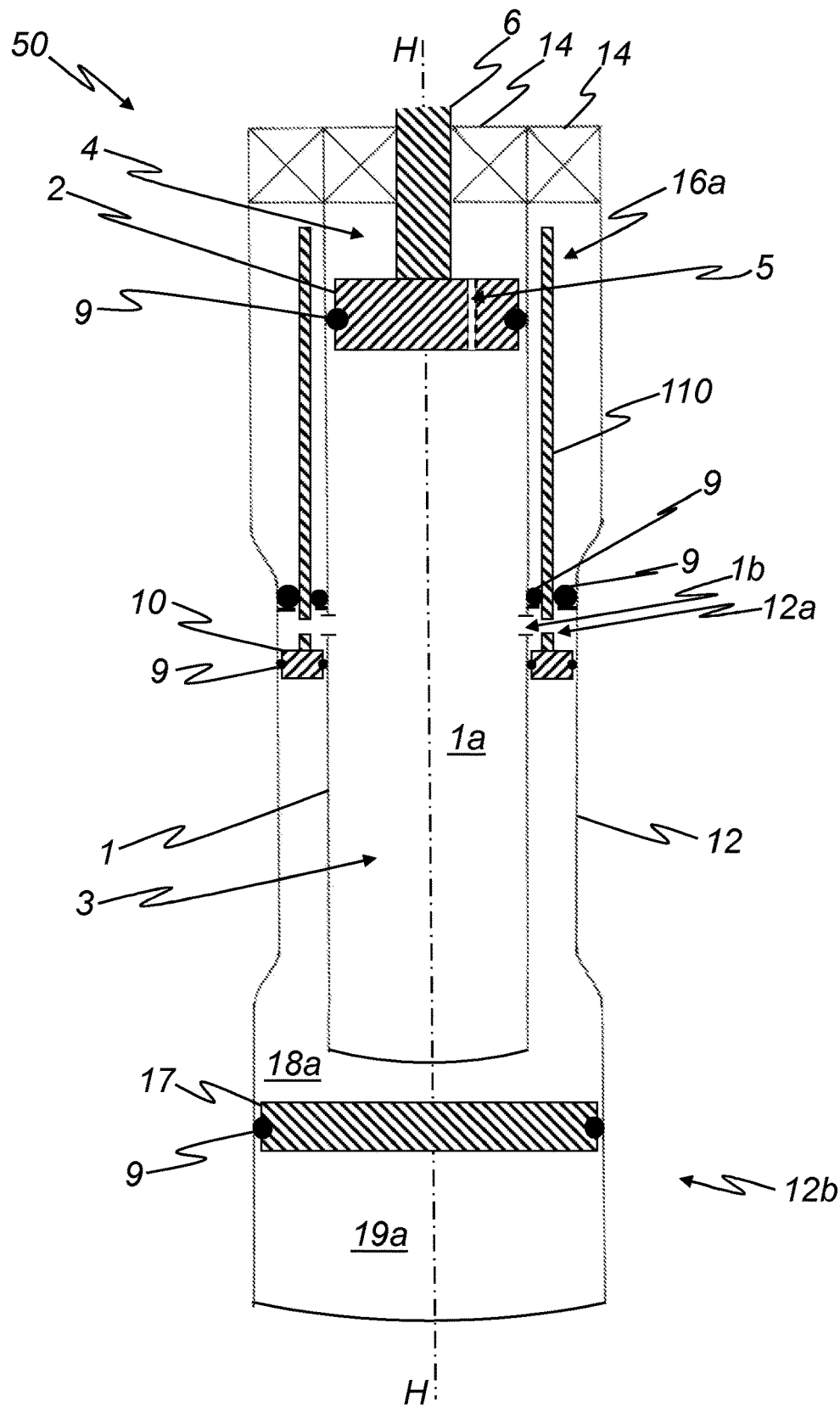

Some of the embodiments will be described in detail, with references to the following Figures, wherein like designations denote like members, wherein:

FIG. 1 shows a schematic longitudinal section through a gas strut according to embodiments of the invention; and FIG. 2 shows a schematic longitudinal section through a further gas strut according to embodiments of the invention along its stroke axis.

DETAILED DESCRIPTION

FIG. 1 shows a schematic longitudinal section through a gas strut 50 according to embodiments of the invention along its stroke axis H.

The gas strut 50 comprises a working cylinder 1 which encloses an inner working space 1a filled with a working gas, not illustrated, e.g., nitrogen. The working cylinder 1 is for example formed substantially hollow-cylindrically and arranged coaxially to the stroke axis H. The working cylinder 1 has for example a length along the stroke axis H of 230 mm and transversely to the stroke axis an internal diameter of 16 mm and an external diameter of 19 mm.

The gas strut 50 comprises a working piston 2 mounted displaceably along a stroke axis H in the inner working space 1a. The working piston 2 is for example formed substantially cylindrically and arranged coaxially to the stroke axis H.

The working piston 2 subdivides the interior 1a of the working cylinder 1 into a first working chamber 3 and a second working chamber 4, which lie one behind the other along the stroke axis H. The working piston 2 may have an in particular annular seal 9 from an inner lateral surface of the working cylinder 1, so that the working medium cannot flow around the working piston 2 upon displacement of the working piston 2 along the stroke axis H.

The working piston 2 may have a restriction bore 5 connecting the first working chamber 3 to the second working chamber 4, in order to make controlled equalisation of pressure between the first working chamber 3 and the second working chamber 4 possible.

To the working piston 2 there is fastened a piston rod 6 which is brought out along the stroke axis H through the second working chamber 4 and, for example through a closure element 14 which closes the working cylinder 1, out of the gas strut 50.

The gas strut 50 comprises an equalizing cylinder 12 which encloses the working cylinder 1 over a partial length of the working cylinder 1 along the stroke axis H. The equalizing cylinder 12 may be formed substantially rotationally symmetrically to the stroke axis H. The equalizing cylinder 12 may enclose the working cylinder 1 over the entire length of the working cylinder 1 along the stroke axis H and additionally along the stroke axis H, in particular may form an excess length 12b over the working cylinder 1 at an end of the working cylinder 1 which is remote from the piston rod 6. The excess length may for example have a length of 20 mm along the longitudinal axis.

The gas strut 50 comprises an equalizing medium (not illustrated) arranged in an equalizing space 16a radially to the stroke axis H between the working cylinder 1 and the equalizing cylinder 12, which medium expands upon an increase in temperature. The equalizing medium fills the equalizing space. The equalizing medium is for example an expansion wax. The equalizing space 16a is formed for example substantially rotationally symmetrically to the stroke axis H. The equalizing space 16a has for example a length of 113 mm along the stroke axis.

The gas strut 50 comprises an outer working space 12a arranged radially to the stroke axis H between the working cylinder 1 and the equalizing cylinder 12, the outer working space 12a being connected in a gas-conducting manner to the inner working space 1a, in particular to the first working chamber 3, for example by a number of openings 1b through a lateral wall of the working cylinder 1. The outer working space 12a is formed for example substantially rotationally symmetrically to the stroke axis H.

The gas strut 50 comprises an equalizing piston 10 enclosing the working cylinder 1 radially to the stroke axis H, the equalizing piston 10 being mounted displaceably along the stroke axis H, delimiting the outer working space 12a on one side transversely to the stroke axis H and being pressurized by a pressure of the working medium and a pressure of the equalizing medium so as to increase the volume of the outer working space 12a. The equalizing piston 10 is for example formed substantially hollow-cylindrically and arranged coaxially to the stroke axis H. The equalizing piston is for example displaceable over an equalizing distance of 84 mm along the stroke axis H.

The gas strut 50 comprises a restoring medium (not illustrated) arranged in a restoring space 15a radially to the stroke axis H between the working cylinder 1 and the equalizing cylinder 12, the equalizing piston 10 being pressurized by a pressure of the restoring medium so as to decrease the volume of the outer working space 12a. The restoring medium is for example a gas, in particular the working gas.

The restoring space 15a is formed for example substantially rotationally symmetrically to the stroke axis H. The restoring space 15a may be arranged partially in an excess length 12b of the equalizing cylinder 12 along the stroke axis H beyond the working cylinder 1. The restoring space 15a may for example at maximum displacement of the equalizing piston 10 towards the restoring space 15a have a minimum length of 60 mm along the stroke axis H.

In an embodiment, the equalizing space 16a, the outer working space 12a and the restoring space 15a are arranged one behind the other along the stroke axis H, with in particular the restoring space 15a possibly being arranged at that end of the gas strut 50 which is remote from the piston rod 6, the equalizing space 16a at that end of the gas strut 50 at which the piston rod 6 is brought out of the gas strut 50, and the outer working space 12a between the restoring space 15a and the equalizing space 16a.

The equalizing space 16a and the restoring space 15a may have a greater diameter transversely to the stroke axis than the outer working space 12a. For example, the equalizing space 16a may have an external diameter of 30 mm, the restoring space 15a an external diameter of 25 mm to 30 mm and the outer working space 12a an external diameter of 25 mm.

The equalizing space 16a and the restoring space 15a may be sealed off from the outer working space 12a with at least one seal 9 in each case, for example with at least one O-ring in each case.

The equalizing space 16a may be closed at an end which is remote from the outer working space 12a with a closure element 14, in particular with a closing disc. The working cylinder 1 and the equalizing space 16a may be closed in particular with a common closure element 14.

The gas strut 50 comprises a tappet 110 which can be expelled out of the equalizing space 16a along the stroke axis H towards the equalizing piston 10 by the pressure of the equalizing medium. The tappet 110 is for example formed substantially hollow-cylindrically and arranged coaxially to the stroke axis H. The tappet 110 may lead out of the equalizing space 16a through the outer working space 12a up to the equalizing piston 10 and in particular be fastened to the equalizing piston 10 or formed in one piece therewith.

In FIG. 1, the gas strut 50 is shown at a low temperature, at which the outer working space 12a has a small volume. Upon warming of the gas strut 50, the equalizing medium expands in the equalizing space 16a and thereby displaces the equalizing piston 10 along the stroke axis H such that the volume of the outer working space 12a is increased (downwards in FIG. 1). As a result, a pressure increase, brought about by the warming, of the working gas in the inner working space 1a and outer working space 12a can be compensated.

Upon cooling of the gas strut 50, the equalizing medium contracts in the equalizing space 16a, so that the pressure of the restoring medium in the restoring space 15a displaces the equalizing piston 10 such that the volume of the outer working space 12a is reduced (upwards in FIG. 1). As a result, a pressure reduction, brought about by the cooling, of the working gas in the inner working space 1a and outer working space 12a can be compensated.

FIG. 2

FIG. 2 shows a schematic longitudinal section through a further gas strut 50 according to embodiments of the invention along its stroke axis H.

Features of the gas strut 50 already shown in FIG. 1 are provided with the same reference numerals as in FIG. 1 and may be configured just as described in relation to FIG. 1.

The restoring space 15a of the gas strut 50 shown in FIG. 2 contains a multiplication piston 17 mounted displaceably along the stroke axis H, the multiplication piston 17 dividing the restoring space 15a, for example with the aid of a seal 9, into a liquid space 18a in contact with the equalizing piston 10 and a gas space 19a separated in a gas-tight manner from the equalizing piston 10.

In this configuration, the liquid space 18a is filled with a hydraulic fluid and the gas space 19a with the restoring medium, which is in the form of a gas.

A cross-sectional area of the multiplication piston 17 transversely to the stroke axis H is greater than a cross-sectional area of the equalizing piston 10 transversely to the stroke axis H, so that the multiplication piston 17 with the equalizing piston 10 and the hydraulic fluid arranged therebetween forms a hydraulic multiplication.

The multiplication piston 17 has for example a greater external diameter transversely to the stroke axis H than the equalizing piston 10.

The multiplication piston 17 is for example of disc-shaped configuration, with a disc plane oriented transversely to the stroke axis H and arranged along the stroke axis H before that end of the working cylinder 1 which is remote from the piston rod 6.

Although the invention has been illustrated and described in greater detail with reference to the preferred exemplary embodiments, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE NUMERALS 1 working cylinder
1a inner working space 1b opening
2 working piston
3 first working chamber
4 second working chamber
5 restriction bore
6 piston rod
9 seal
10 equalizing piston
12 equalizing cylinder
12a outer working space
14 closure element
15a restoring space
16a equalizing space
17 multiplication piston
18a liquid space
19a gas space
50 gas strut
110 tappet
H stroke axis

The invention claimed is:

1. A gas strut, comprising:
a working cylinder enclosing an inner working space filled with a working gas;
a working piston, wherein the working piston is displaceable along a stroke axis in the inner working space;
an equalizing cylinder enclosing the working cylinder at least over a partial length of the working cylinder along the stroke axis;
an equalizing space arranged between the working cylinder and the equalizing cylinder in a direction radial to the stroke axis;
an equalizing medium which expands upon an increase in temperature, arranged in the equalizing space;
an outer working space arranged between the working cylinder and the equalizing cylinder in a direction radial to the stroke axis;
wherein the outer working space is connected to the inner working space in a gas-conducting manner by a number of openings through a lateral wall of the working cylinder;
an equalizing piston enclosing the working cylinder in a direction radial to the stroke axis, wherein the equalizing piston
is displaceable along the stroke axis;
wherein at least one side of the equalizing piston delimits the outer working space, and
wherein the equalizing piston is pressurized by a pressure of the working medium and a pressure of the equalizing medium to increase a volume of the outer working space;
a restoring space arranged between the working cylinder and the equalizing cylinder in a direction radial to the stroke axis, and
a restoring medium arranged in the restoring space, wherein the equalizing piston is pressurized by a pressure of the restoring medium to decrease the volume of the outer working space.

2. The gas strut according to claim 1, wherein the equalizing piston is arranged completely in the equalizing cylinder.

3. The gas strut according to claim 1, wherein the outer working space is arranged between the equalizing space and the restoring space in a direction along the stroke axis.

4. The gas strut according to claim 1, further comprising a tappet which can be expelled out of the equalizing space along the stroke axis towards the equalizing piston by the pressure of the equalizing medium, wherein the tappet has a smaller cross-sectional area measured in a plane radial to the stroke axis than the equalizing piston.

5. The gas strut according to claim 1, wherein the equalizing cylinder forms at least one excess length over the working cylinder along the stroke axis, wherein the at least one excess length contains a part of the restoring space.

6. The gas strut according to claim 5, further comprising a piston rod, wherein the piston rod is fastened to the working piston, wherein the piston rod is mounted in the working cylinder and is displaceably along the stroke axis, and wherein the at least one excess length is arranged at an end of the working cylinder which is remote from the piston rod along the stroke axis.

7. The gas strut according to claim 1, wherein the outer working space has a smaller diameter measured in a direction radial to the stroke axis than the equalizing space and/or the restoring space.

8. The gas strut according to claim 7, wherein the equalizing cylinder encloses the equalizing space, the outer working space, and the restoring space in a direction radial to the stroke axis, wherein a diameter of the equalizing cylinder measured in a direction radial to the stroke axis is wider in a region of the equalizing space and/or of the restoring space than in a region of the outer working space.

9. The gas strut according to claim 1, wherein the restoring medium is a gas.

10. The gas strut according to claim 1,
wherein the restoring space contains a multiplication piston mounted displaceably along the stroke axis;
wherein the multiplication piston divides the restoring space into a liquid space in contact with the equalizing piston and a gas space separated in a gas-tight manner from the equalizing piston;
wherein the liquid space is filled with a hydraulic fluid and the gas space is filled with the restoring medium; and
wherein a cross-sectional area of the multiplication piston measured in a plane radial to the stroke axis is larger than a cross-sectional area of the equalizing piston measured in a plane radial to the stroke axis.

11. A method for producing the gas strut according to claim 1, the method comprising:
arranging the working cylinder of the gas strut in the equalizing cylinder of the gas strut;
filling the restoring medium, the equalizing piston, and the equalizing medium of the gas strut in a space between the working cylinder and the equalizing cylinder after the arranging;
introducing the working piston and the working gas of the gas strut into the working cylinder after the arranging; and
gas-tight closing of the working cylinder and the equalizing cylinder after the filling and introducing.

12. The method according to claim 11, further comprising:
simultaneous introducing of the working gas into the inner and outer working space and filling of the working gas as restoring medium into the restoring space of the gas strut, through a non-return valve from the working space to the restoring space; and
letting off part of the working medium from the inner working space and from the outer working space after the introducing and filling.

13. The method according to claim 11, further comprising: widening a diameter of the equalizing cylinder measured in a direction radial to the stroke axis in a region of the equalizing space and/or in a region of the restoring space relative to a region of the outer working space.

14. A drive system for a flap comprising:
a. the gas strut according to claim 1 for supporting the flap; and
b. an electromechanical drive for driving the flap.

* * * * *